(12) United States Patent
Fuller et al.

(10) Patent No.: US 10,899,551 B1
(45) Date of Patent: Jan. 26, 2021

(54) ANGLE ADJUSTMENT MECHANISM FOR A CONVEYOR BED

(71) Applicant: INTELLIGRATED HEADQUARTERS, LLC, Mason, OH (US)

(72) Inventors: Brandon Fuller, Granite City, IL (US); Thomas Michael Ferner, Lake Saint Louis, MO (US); Frank Pellegrino, Saint Louis, MO (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 16/674,420

(22) Filed: Nov. 5, 2019

(51) Int. Cl.
| | |
|---|---|
| *B65G 41/00* | (2006.01) |
| *B65G 13/02* | (2006.01) |
| *B65G 47/252* | (2006.01) |
| *B65G 21/12* | (2006.01) |
| *B65G 39/12* | (2006.01) |
| *B65G 13/12* | (2006.01) |

(52) U.S. Cl.
CPC ........... *B65G 41/002* (2013.01); *B65G 13/02* (2013.01); *B65G 13/12* (2013.01); *B65G 21/12* (2013.01); *B65G 39/12* (2013.01); *B65G 47/252* (2013.01); *B65G 2203/0225* (2013.01)

(58) Field of Classification Search
CPC ...... B65G 41/002; B65G 13/02; B65G 13/12; B65G 21/12; B65G 47/252; B65G 2203/0225

USPC .......................................... 198/861.1–861.6
See application file for complete search history.

(56) References Cited

U.S. PATENT DOCUMENTS

| | | | | |
|---|---|---|---|---|
| 6,063,656 A | * | 5/2000 | Clampitt | ........... H01L 27/10852 |
| | | | | 257/306 |
| 6,126,383 A | * | 10/2000 | Franklin | .............. B65G 47/086 |
| | | | | 198/374 |
| 8,205,738 B1 | | 6/2012 | Fourney | |

FOREIGN PATENT DOCUMENTS

| | | | | |
|---|---|---|---|---|
| CN | 210794631 U | * | 6/2019 | ............ B65G 21/12 |
| JP | 4450274 B2 | | 4/2010 | |

* cited by examiner

*Primary Examiner* — Gene O Crawford
*Assistant Examiner* — Lester Rushin, III
(74) *Attorney, Agent, or Firm* — Alston & Bird LLP

(57) ABSTRACT

A conveyor bed is provided that can include a conveyor frame, a roller frame and an adjustment mechanism. The adjustment mechanism can include a first wheel movable on a first rail and a second wheel movable on a second rail. A sled can be coupled to a bottom face of the roller frame, where an inner face of the sled is in contact with the first wheel and the first rail and an outer face of the sled is in contact with the second wheel and the second rail. An actuable component coupled to the sled, wherein the actuable component is configured to move the sled back and forth linearly along the first rail using the first wheel in response to rotation of the actuable component, wherein a movement of the sled rotates the second wheel and pivots the second rail to alter an angle of the roller frame.

20 Claims, 7 Drawing Sheets

ANGLE ADJUSTMENT MECHANISM FOR A CONVEYOR BED

TECHNOLOGICAL FIELD

The present disclosure relates generally to a conveyor bed with an angle adjustment mechanism, and, more particularly, to an angle adjustment mechanism for a roller bed in a conveyor system.

BACKGROUND

Generally, conveyors are a part of material handling systems capable of transporting goods from one location to another location in a warehouse environment. These conveyors may fall under broad categories such as roller conveyors or belt conveyors. These conveyors are often divided into several conveyor zones with each zone operating independently or collaboratively to transport the goods in the desired fashion. Often, when transporting the goods on these conveyors, there might be a need for changing an orientation of the goods before they are transported to downstream zones for further processing. Such change in the orientation is effected by rotation of the goods in the conveyor zones to a desirable amount based on characteristics of the goods.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a conveyor bed including a conveyor frame and a roller frame coupled to the conveyor frame. An adjustment mechanism positioned on the conveyor bed. The adjustment mechanism includes a first wheel movable on a first rail, wherein the first rail is a fixed horizontal rail and a second wheel movable on a second rail, wherein the second rail is a slanted pivotable rail. A sled coupled to a bottom face of the roller frame, wherein an inner face of the sled is in contact with the first wheel and the first rail and an outer face of the sled is in contact with the second wheel and the second rail. An actuable component coupled to the sled, wherein the actuable component is configured to move the sled back and forth linearly along the first rail using the first wheel in response to rotation of the actuable component, wherein a movement of the sled rotates the second wheel and pivots the second rail to alter an angle of the roller frame.

Various example embodiments described herein relate to a conveyor bed with the roller frame including a plurality of brackets spaced apart from each other, wherein a bottom face of each bracket of the plurality of brackets is coupled to the sled.

Various example embodiments described herein relate to a conveyor bed having a roller frame. The roller frame includes a bracket. The bracket of the plurality of brackets comprises a curved slot with a shoulder bolt attached to the curved slot.

Various example embodiments described herein relate to a conveyor bed with the roller frame coupled to a mounting bracket, positioned at one of an upstream end of the conveyor bed or a downstream end of the conveyor bed.

Various example embodiments described herein relate to a conveyor bed, in which the roller frame is coupled to the mounting bracket using shoulder bolts.

Various example embodiments described herein relate to a conveyor bed having the adjustment mechanism. The actuable component of the adjustment mechanism is fastened to a front face of the sled using a nut.

Various example embodiments described herein relate to a conveyor bed with the adjustment mechanism including a plurality of first wheels and first rails capable of moving the inner face of the sled, each first wheel of the first wheels positioned on a respective first rail of the first rails.

Various example embodiments described herein relate to a conveyor bed with the adjustment mechanism including a plurality of second wheels and second rails capable of moving the outer face of the sled, each second wheel of the second wheels positioned on a respective second rail of the second rails, wherein the second rail is positioned on a wedge-shaped plate attached to the bottom face of the roller frame.

Various example embodiments described herein relate to a conveyor bed with the adjustment mechanism including the sled which moves in a first linear direction in response to a clockwise rotation of the actuable component and moves in a second linear direction opposite the first linear direction in response to a counter-clockwise rotation of the actuable component.

Various example embodiments described herein relate to a conveyor bed with the adjustment mechanism including the sled, wherein in response to movement of the sled, the second rail pivots to one or more positions based on a degree and direction of movement of the sled.

Various example embodiments described herein relate to a conveyor bed with the adjustment mechanism, wherein in response to pivoting of the second rail to the one or more positions, the roller frame is pitched at one or more corresponding angles with respect to the conveyor frame.

Various example embodiments described herein relate to a conveyor bed with the adjustment mechanism, wherein the roller frame is pitched at an angle with respect to the horizontal plane of the conveyor frame by the movement of the sled.

Various example embodiments described herein relate to a conveyor bed with the adjustment mechanism including an electric actuator comprising a stepper motor and speed reducing mechanism to rotate the actuable component.

Various example embodiments described herein relate to a conveyor bed with a plurality of rollers attached to the roller frame and divided into a plurality of zones with each zone operating at a differential speed.

Various example embodiments described herein relate to an adjustment mechanism used to alter an angle of a roller bed. The adjustment mechanism includes a wheel and a rail, wherein the rail is a slanted pivotable rail. A sled coupled to a bottom face of the roller bed. An actuable component coupled to the sled, wherein the actuable component is configured to move the sled back and forth linearly in response to a rotation of the actuable component such that the movement of the sled rotates the wheel and pivots the rail to alter an angle of the roller bed.

Various example embodiments described herein relate to an adjustment mechanism, wherein when the actuable component is rotated, the movement of sled pushes the rail to pivot to one or more positions based on a degree of movement of the sled, and wherein the rail is positioned on a wedge-shaped plate attached to a bottom face of the roller bed.

Various example embodiments described herein relate to an adjustment mechanism including an electric actuator comprising stepper motor and speed reducing mechanism to operate the actuable component.

Various example embodiments described herein relate to an adjustment mechanism including the actuable component. The actuable component includes a first portion and a second portion, wherein the first portion comprises a first end and a second end, wherein the first end is a free end connected to an electric actuator and the second end is coupled to an L-clamp plate and the second portion connected to the sled and the L-clamp plate.

Various example embodiments described herein relate to a method of altering an angle of a conveyor bed. The method includes inducting an article into a conveyor bed comprising one or more conveyor zones. Further, the method includes changing an orientation of the article by positioning a roller of the one or more conveyor zones at a predetermined angle. Positioning the roller includes rotating an actuable component of the conveyor bed and moving a sled linearly back and forth in response to the rotation of the actuable component such that the movement of the sled pivots a rail to alter an angle of the roller.

Various example embodiments described herein, relate to a method of altering an angle of a conveyor bed, wherein changing the orientation of the one or more articles further includes operating the one or more conveyor zones at different speeds while positioning the roller at the predetermined angle.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
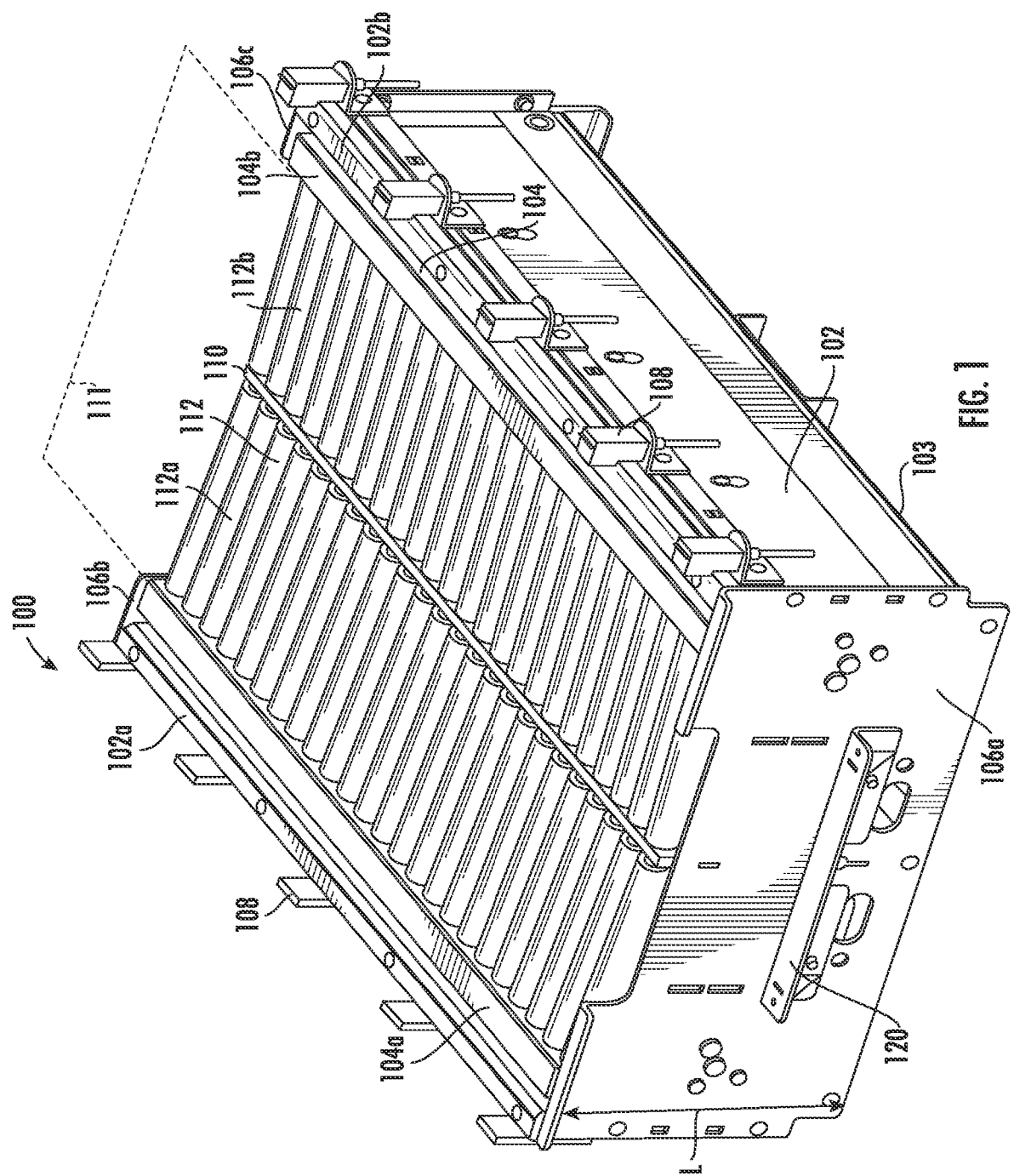
FIG. 1 illustrates a perspective view of a conveyor bed, in accordance with an embodiment of the present disclosure.

Some embodiments of the present disclosure will now be described more fully hereinafter with reference to the accompanying drawings, in which some, but not all embodiments are shown. Indeed, the concepts described here may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

The term "conveyor" or "conveyor zone" or "conveyor system" or "conveyor bed" may be used interchangeably throughout the specification.

Further, the term "conveyor rollers" or "rollers" may be used interchangeably throughout the specification.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

Generally, when products or goods on conveyor zones are rotated or turned to a certain degree to maintain the goods entering and leaving the conveyor zones in a uniform orientation. In certain scenarios, a width of the conveyor zone may be fixed and product to be handled by the conveyor zone may have a larger footprint. In such cases, an oversized product is to be handled by the conveyor zone of limited width, which may cause the product to jam between the side rails of the conveyor zone. Manual intervention may then be used to free the jam. Further, in certain other scenarios, the turning of the products may be limited to a certain speed limit which may increase the time for turning each product of different size and shape, thereby, reducing the throughput of the conveyor system. Further, in the certain other scenarios, when the products are handled by a roller conveyor, one or more of rollers of the roller conveyor may be angled and fixedly connected to the conveyor zone to impart turning to the products. Such angled rollers may not be suitable to handle products of different size and shape as they are fixed at a certain angle in each conveyor zone of the conveyor system. Furthermore, product turner assemblies are well known for rotating the products, i.e., for rotating the products to a designated amount, usually 90°, as they are conveyed along their path from one conveyor zone to another conveyor zone. However, such known product turner assemblies have operating and structural characteristics which make them undesirable for use with different variety of products and packages.

Various example embodiments described herein relate to a conveyor bed including a conveyor frame and a roller frame coupled to the conveyor frame. The roller frame includes an adjustment mechanism. The adjustment mechanism includes a first wheel movable on a first rail, wherein the first rail is a fixed horizontal rail and a second wheel movable on a second rail, wherein the second rail is a slanted pivotable rail. A sled coupled to a bottom face of the roller frame, wherein an inner face of the sled is in contact with the first wheel and the first rail and an outer face of the sled is in contact with the second wheel and the second rail. An actuable component coupled to the sled, wherein the actuable component is configured to move the sled back and forth linearly along the first rail using the first wheel in response to rotation of the actuable component, wherein a movement of the sled rotates the second wheel and pivots the second rail to alter an angle of the roller frame. The angle of the roller frame is altered to any desired degrees with respect to a horizontal plane of the conveyor frame. Such alteration of the angle may be based on the type of products being handled by the conveyor system.

According to an embodiment, a speed of the conveyor zone may be altered when the roller frame is altered to any desired degrees by the adjustment mechanism with respect to a horizontal plane of the conveyor frame to provide high-speed rotation of the products of various sizes and shapes.

According to an embodiment, the roller frame comprises a plurality of brackets spaced apart from each other, wherein a bottom face of each bracket of the plurality of brackets is coupled to the sled.

According to an embodiment, the adjustment mechanism comprises a plurality of first wheels and first rails capable of moving the inner face of the sled, each first wheel of the first wheels positioned on a respective first rail of the first rails.

According an embodiment, the adjustment mechanism comprises a plurality of second wheels and second rails capable of moving the outer face of the sled, each second wheel of the second wheels positioned on a respective second rail of the second rails, wherein the second rail is positioned on a wedge-shaped plate attached to the bottom face of the roller frame.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

Figure 2:
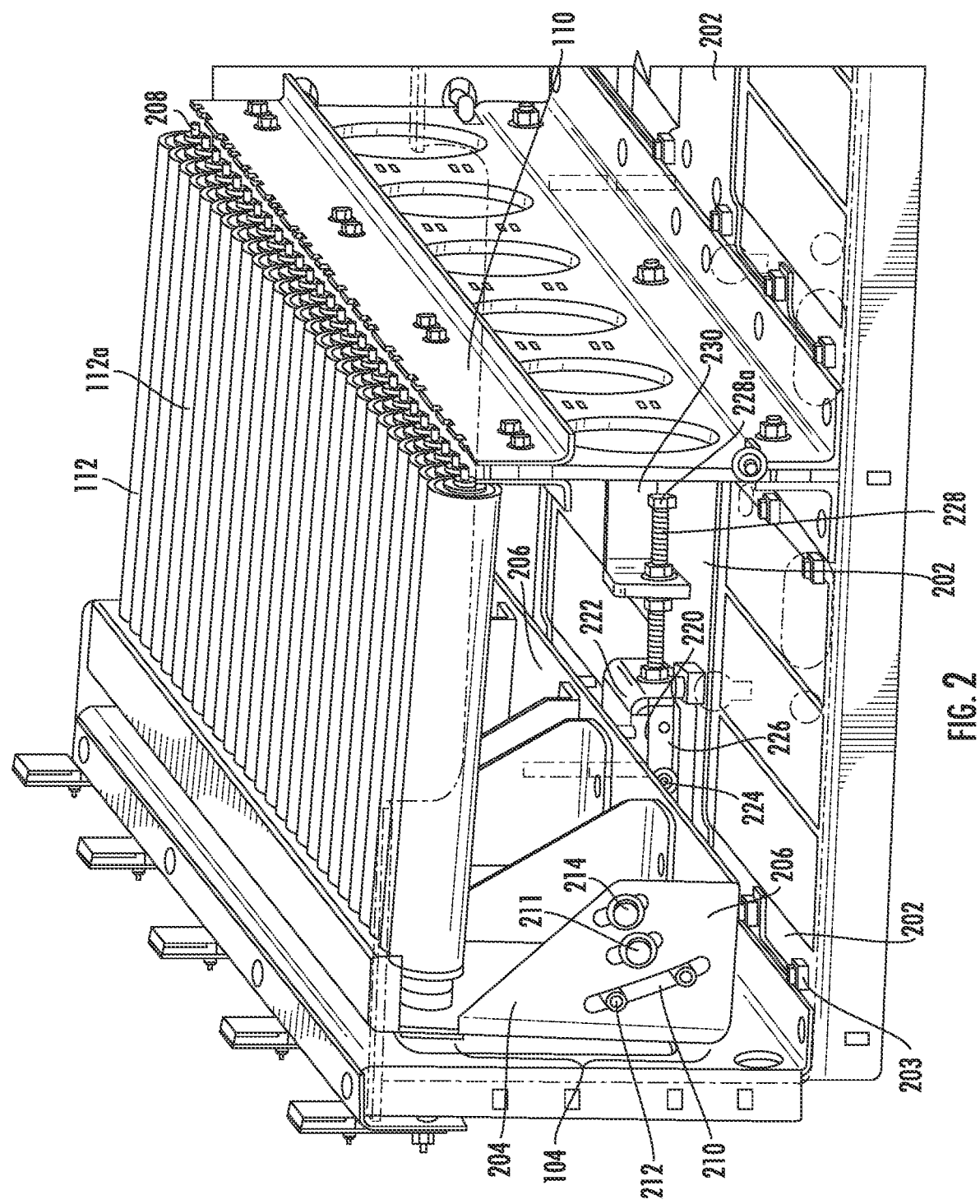
FIG. 2 illustrates a partial perspective view of the conveyor bed of FIG. 1 with an adjustment mechanism shown, in accordance with an embodiment of the present disclosure.

FIG. 1 illustrates a perspective view of a conveyor bed 100, in accordance with an embodiment of the present disclosure. In FIG. 1, a conveyor bed 100 from a plurality of conveyor beds of a conveyor system is depicted. The conveyor bed 100 includes a conveyor frame 102, a roller frame 104, mounting brackets 106a, 106b, 106c, one or more sensors 108. The conveyor frame 102 includes a pair of conveyor rails 102a, 102b i.e., a first conveyor rail 102a and a second conveyor rail 102b. The first conveyor rail 102a and the second conveyor rail 102b are coupled to the mounting brackets 106a, 106b, 106c. A first mounting bracket 106a positioned at an upstream end of the conveyor bed 100 and a second and third mounting bracket 106b, 106c positioned at a downstream end of the conveyor bed 100. The pair of conveyor rails 102a, 102b extend up to a predefined length in an "XZ" plane opposite to a horizontal plane 111 of the conveyor frame 102. For example, the predefined length of the pair of conveyor rails 102a, 102b may be equal to a length 'L' of the mounting brackets 106a, 106b, 106c. In some example, the pair of conveyor rails 102a, 102b may extend beyond the length 'L' of the mounting brackets 106a, 106b, 106c in the "XZ" plane such that bottom ends 103 of the pair of conveyor rails 102a, 102b contact a floor of the warehouse in such a manner to support the conveyor frame 102. According to an embodiment, the bottom ends 103 of the pair of conveyor rails 102a, 102b may be L-shaped to clamp with the cross-member support 202 as shown in FIG. 2. In some examples, the cross-member support 202 may contact the floor of the warehouse in such a manner to support the conveyor frame 102. The cross-member support 202 may be coupled to the pair of conveyor rails 102a, 102b and the mounting brackets 106a, 106b, 106c using suitable fasteners, such as, but not limited to, screws, nuts, washers, bolts, and their combination. According to an embodiment, the pair of mounting brackets 106a, 106b, 106c may include additional mounts 120 which enable the conveyor frame 102 to be mounted on to an elevated location above the floor of the warehouse. In some example, the additional mounts may be used for coupling with a neighboring conveyor zone. According to an embodiment, one or more sensors 108 are positioned on the pair of conveyor rails 102a, 102b to sense one or more parameters associated with the product entering the conveyor bed 100. The one or more parameters, for example, may include the length of the product, the presence of the product, the orientation of the product, and/or their like.

According to an embodiment, the roller frame 104 includes a pair of roller rails 104a, 104b positioned adjacent and in parallel with pair of conveyor rails 102a, 102b. The pair of rollers rails include a first roller rail 104a positioned in parallel with the first conveyor rail 102a and a second roller rail 104b positioned in parallel with the second conveyor rail 102b. The first roller rail 104a and the second roller rail 104b are coupled to the mounting brackets 106a, 106b, 106c. One end of the first roller rail 104a, the second roller rail 104b, the first conveyor rail 102a and the second conveyor rail 102b are coupled to the first mounting bracket 106a at the downstream end of the conveyor bed 100; and the other end of the first roller rail 104a, the second roller rail 104b, the first conveyor rail 102a and the second conveyor rail 102b are coupled to the second and third mounting bracket 106b, 106c at the downstream end of the conveyor bed 100. The roller frame 104 and the conveyor frame 102 are held in parallel using the mounting brackets 106a, 106b, 106c. According to an embodiment, the pair of roller rails 104a, 104b extend up to a predefined length in an "XZ" plane opposite to a horizontal plane 111 of the conveyor frame 102. For example, the predefined length of the pair of roller rails 104a, 104b may be equal to a length of the mounting brackets 106a, 106b, 106c. In some examples, the predefined length of the pair of roller rails 104a, 104b may be less than the length of the pair of conveyor rails 102a, 102b. In some examples, the pair of roller rails 104a, 104b extend up to one half of the length of pair of conveyor rails 102a, 102b.

According to an embodiment, as shown in FIG. 2, the roller frame 104 include one or more brackets 204 coupled to the first roller rail 104a and the second roller rail 104b at a bottom face of the roller frame 104. FIG. 2 illustrates a partial perspective view of the conveyor bed 100 of FIG. 1 with an adjustment mechanism 220 shown, in accordance with an embodiment of the present disclosure. The brackets 204 are provided in a sequence and coupled to a common coupling plate 206. For example, bottom faces of the brackets 204 may be coupled to the common coupling plate 206. The brackets 204, for example, can be L-shaped brackets arranged equidistant from each other in a common reference plane at the bottom face of the roller frame 104. The common coupling plate 206 extend in an XY plane parallel to the horizontal plane 111 of the conveyor frame 102. The common coupling plate 206 supports the one or more brackets 204 of the roller frame 104. The one or more brackets 204 and the common coupling plate 206 is provided along with the first roller rail 104a and the second roller rail 104b of the conveyor frame 102. According to an embodiment, the first roller rail 104a, the second roller rail 104b, the one or more brackets 204 and the common coupling plate 206 collectively form the roller frame 104. According to an embodiment, the roller frame 104 include one or more rollers 112 positioned on a top face the roller frame 104 in between the first roller rail 104a and the second roller rail 104b. In some examples, a pair of rollers 112 is positioned in between the first roller rail 104a and the second roller rail 104b with axles 208 of the pair of rollers inserted into an axle holding aperture (not shown) provided in both the first roller rail 104a and the second roller rail 104b. According to an embodiment, the conveyor frame 102 further includes a coupling mechanism 110 provided at a center of the conveyor frame 102 equidistant from both the first roller rail 104a and the second roller rail 104b. In some examples, one end of the pair of axles 208 are positioned on the coupling mechanism 110 and the other end of the pair of axles 208 are positioned on the first roller rail 104a and the second roller rail 104b respectively. As shown in FIG. 1 and FIG. 2, the first set of rollers 112a of the roller frame 104 are coupled to the first roller rail 104a and the coupling mechanism 110; and the second set of rollers 112b are coupled to the second roller rail 104b and the coupling mechanism 110. The coupling mechanism 110 may be fixedly attached to the cross-member support 202 of the conveyor frame 102. The first set of rollers 112a and the second set of rollers 112b are supported on the roller frame 104 by means of the one or more brackets 204 and the common coupling plate 206 dedicated for each set of rollers.

Figure 5:
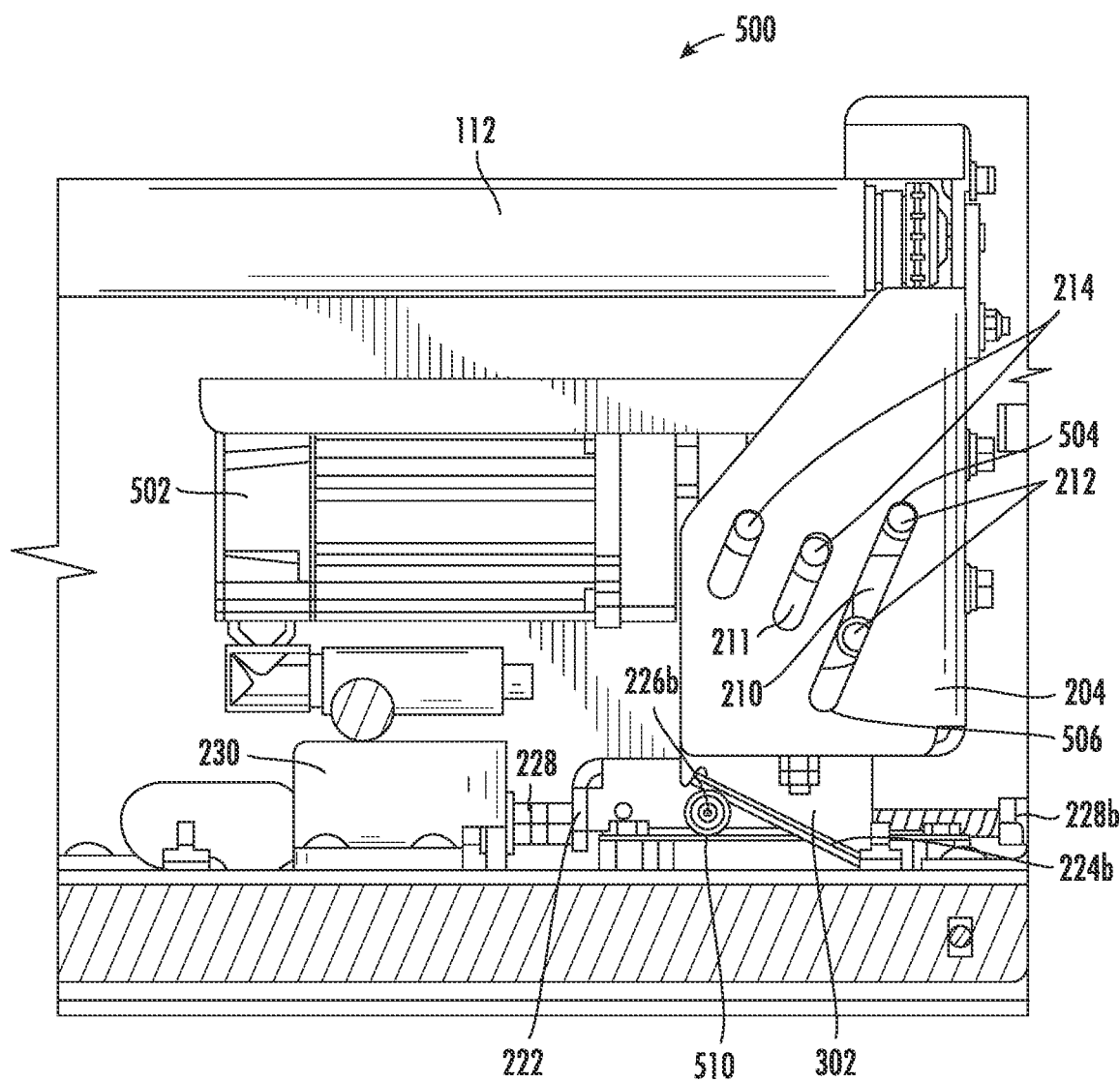
FIG. 5 illustrates a side view of the adjustment mechanism of FIG. 2 in a home position, in accordance with an embodiment of the present disclosure.
Figure 6:
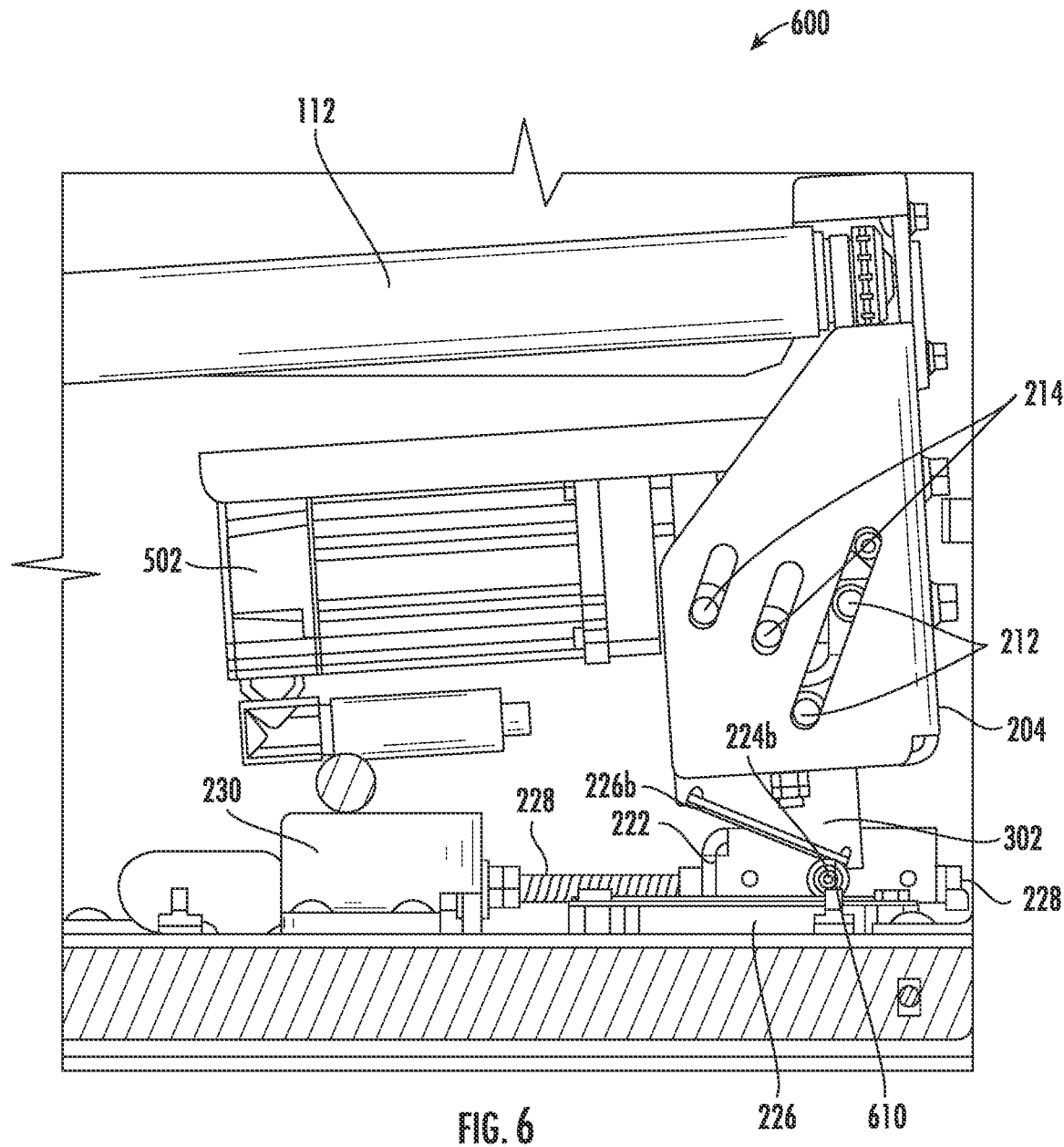
FIG. 6 illustrates a side view of the adjustment mechanism of FIG. 2 in a work position, in accordance with an embodiment of the present disclosure.

As shown in FIG. 2, according to an example embodiment, the one or more brackets 204 include curved slots. The curved slots receive one or more fasteners. In the example embodiment, the curved slots receive shoulder bolts. In some examples, the one or more brackets 204 include additional slots that receive locking bolts. The shoulder bolts are the locking bolts are fixedly connected to the curved slot and the additional slots respectively. The shoulder bolts and the locking bolts couple the roller frame 104 with the mounting brackets 106a, 106b, 106c. For example, the shoulder bolts and the locking bolts extend from dedicated holes (not shown) on the mounting brackets 106a, 106b, 106c to the curved slot of the brackets 204 to couple the roller frame 104 with the mounting brackets 106a, 106b, 106c. In some examples, the shoulder bolts and the locking bolts are provided to support the roller frame 104 in a home position 500 and also in a work position 600. For example, the shoulder bolts may act as a limit stop to lock the roller in the home position 500 and the work position 600. The functions of these bolts will be explained in detail in conjunction with FIGS. 5 and 6 depicting the roller frame 104 in the home position 500 and the work position 600.

According to an embodiment, the roller frame 104 is supported on an adjustment mechanism 220 provided on the conveyor frame 102. The adjustment mechanism 220 is positioned at a bottom face of the roller frame 104. For example, the adjustment mechanism 220 is positioned abutting a bottom face of the common coupling plate 206. In some examples, the adjustment mechanism 220 may be provided abutting a bottom face of the one or more brackets 204 when the roller frame 104 is devoid of the common coupling plate 206. For example, the adjustment mechanism 220 may be detachably coupled to the cross-member support 202 of the conveyor frame 102 which supports and links the first conveyor rail 102a and the second conveyor rail 102b. In some examples, the one or more brackets 204 and the common coupling plate 206 supporting either one of the first set of rollers 112a or the second set of rollers 112b are supported on the adjustment mechanism 220. As shown in FIG. 2, the adjustment mechanism 220 may be provided in conjunction with the one or more brackets 204 and the common coupling plate 206 of the first roller rail 104a having the first set of rollers 112a. In some examples, the adjustment mechanism 220 may be provided in conjunction with the one or more brackets 204 and the common coupling plate 206 of both the first set of rollers 112a and the second set of rollers 112b. As shown in FIG. 2, the adjustment mechanism 220 may be provided at a center of the conveyor frame 102 and positioned equidistant from the mounting brackets 106a, 106b, 106c provided on the upstream end and the downstream end.

Figure 3:
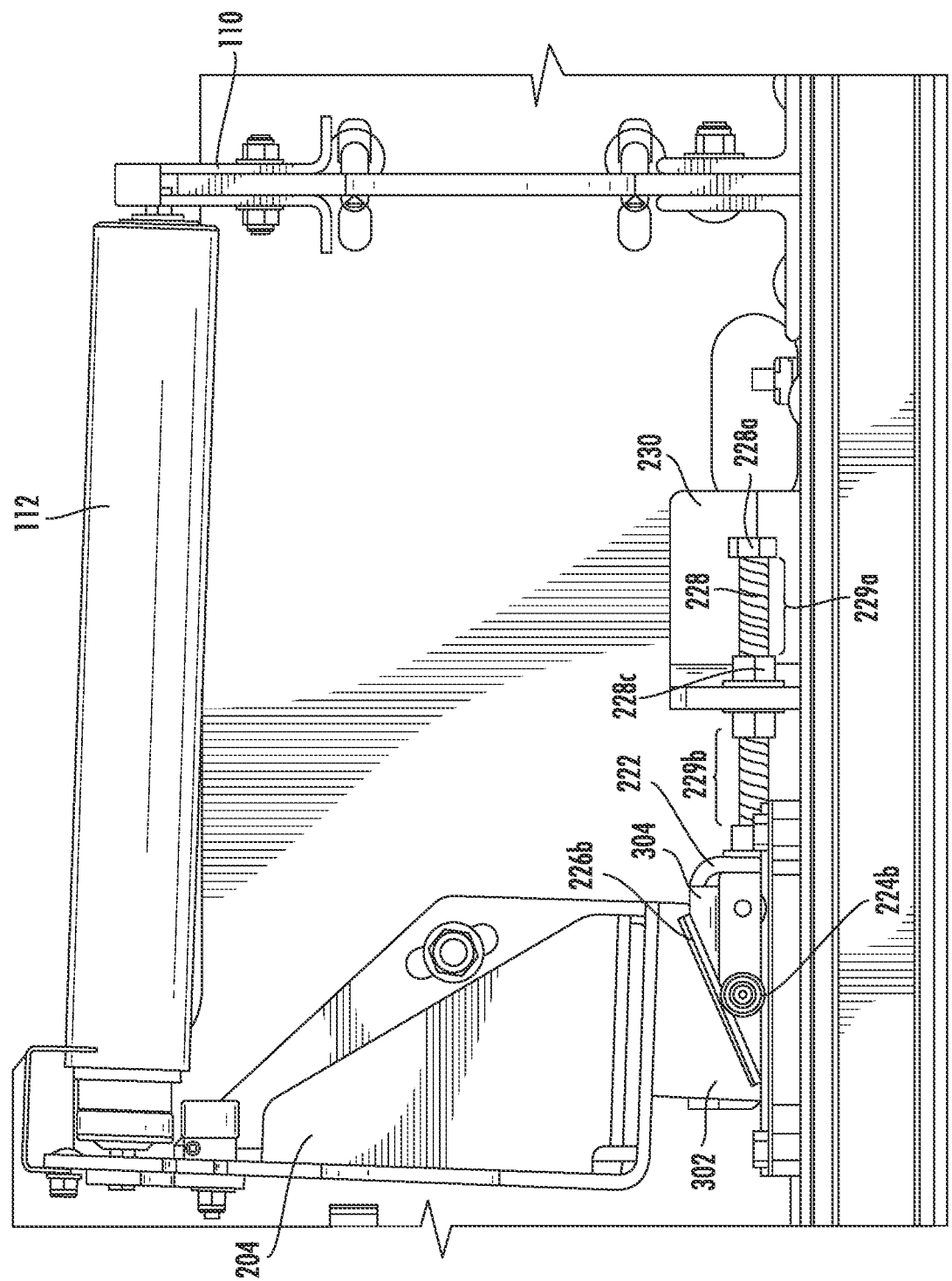
FIG. 3 illustrates a side view of the adjustment mechanism of FIG. 2, in accordance with an embodiment of the present disclosure.
Figure 4:
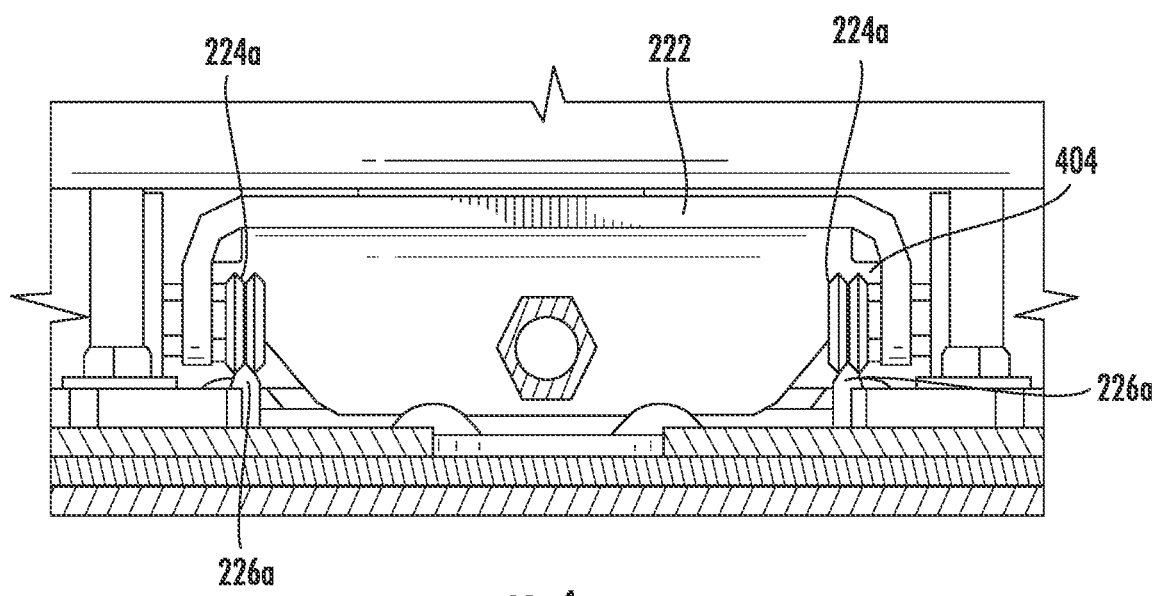
FIG. 4 illustrates a cross-sectional front view of the adjustment mechanism of FIG. 2, in accordance with an embodiment of the present disclosure.

According to an embodiment, the adjustment mechanism 220 includes a sled 222, one or more wheels 224, one or more rails 226, wedge-shaped plate 302 (not shown) and an actuable component 228. The adjustment mechanism 220 supports the roller frame 104. For example, the wedge-shaped plate 302 302 is attached to the sled 222 and supports the roller frame 104. The wedge-shaped plate 302 is attached to an outer face 304 of the sled 222 as shown in FIG. 3. In some examples, two wedge-shaped plate 302 may be provided on outer faces of the sled 222 to support the roller frame 104. The one or more wheels and rails include a first wheel 224a, a second wheel 224b, a first rail 226a and a second rail 226b. The first wheel 224a movable on a first rail 226a, wherein the first rail 226a is a fixed horizontal rail. The second wheel 224b movable on a second rail 226b, wherein the second rail 226b is a slanted pivotable rail. An inner face 404 of the sled 222 is in contact with the first wheel 224a and the first rail 226a as shown in FIG. 4 and the outer face of the sled 222 is in contact with the second wheel 224b and the second rail 226b. A movement of the sled 222 is enabled by the first wheel 224a and the first rail 226a. In some examples, the inner face of the sled 222 may include two first wheel 224a and rails 226a positioned on inner faces of the sled 222 as shown in the cross-sectional front view of FIG. 4. These wheels 224a facilitate the movement of the sled 222 back and forth on the rails 226a. As shown in FIG. 3, the second rail 226b is a slanted pivotable rail positioned on the outer face of the sled 222 and attached to the wedge-shaped plate 302. In some examples, the slanted pivot rail is inclined at acute angles with respect to a top face of the sled 222. The second wheel 224b is maneuverable on the second rail 226b. In some examples, additional rails may be provided on the outer faces of the sled 222 for the second wheel 224b such that the second wheel 224b is movable on both the second rail 226b and the additional rails (not shown). In some example, the first wheel 224a and the second wheel 224b may be V-shaped wheels. The V-shaped wheels may include V-shaped grooves in a center of the wheel to mate with the V-shaped projections of the first rail 226a and the second rail 226b. The V-shaped wheels and the V-shaped projections on the rails are clearly depicted in the example embodiment of FIG. 4. In the example embodiment, as shown in FIG. 2, the sled 222 with the first wheel 224 is fixed on the first rail 226. The first rail 226 act as a guide to move the sled 222 back and forth with help of the first wheel 224. The second wheel 224b provided on the outer face of the sled 222 is guided by the second rail 226b fixed to the wedge-shaped plate 302 and the sled 222.

As shown in FIG. 2, one end of the actuable component 228 may be attached to the cross-member support 202 of the conveyor frame 102 through an L-clamp plate 230 and the other end may be attached to the sled 222. For example, the actuable component 228 includes a first portion 229a and a second portion 229b, wherein the first portion 229a comprises a first end 228a and a second end 228c, wherein the first end 228a is a free end connected to an electric actuator (not shown) and the second end is coupled to an L-clamp plate 230 and the second portion 229b connected to the sled 222 and the L-clamp plate 230. In some examples, the electric actuator may include a stepper motor and a speed reducing mechanism to operate the actuable component 228. In some examples, the actuable component 228 may be actuated manually. According to an embodiment, the actuable component 228 is operated to push the sled 222 back and forth on the first rail 226 using the first wheel 224. For example, the actuable component may be a jack bolt and when the jack bolt is rotated clockwise, the sled 222 moves in a first linear direction and when the jack bolt is rotated counter-clockwise, the sled 222 moves in a second linear direction opposite the first linear direction in response to a counter-clockwise rotation of the jack bolt. In various embodiments, instead of the jack bolt, other types of bolts configured to manipulate a sled in response to adjustment of the bolt are also considered. In response to the movement of the sled 222, the second rail 226b pivots to one or more positions based on a degree and direction of movement of the sled 222. The second rail 226b pivots along with the wedge-shaped plate 302 to pitch the roller frame 104 at one or more corresponding angles with respect to the conveyor frame 102.

FIG. 3 illustrates a side view of the adjustment mechanism 220 of FIG. 2, in accordance with an embodiment of the present disclosure. The actuable component 228 is rotated to push the sled 222 in a linear direction to pivot the wedge-shaped plate 302 along with the second rail 226b to one or more positions in such a manner to orient the roller frame 104 in a predefined angle. For example, the roller frame 104 is in a home position 500 when the second rail 226b is in a non-pivoting position. The second wheel 224b is in a stationary position when the second rail 226b is in the non-pivoting position. In the non-pivoting position, the roller bed 112 remains flat and parallel to the horizontal plane 111 of the conveyor frame 102. Further, when the second rail 226b is in a pivoting position, the roller frame 104 is in a work position 600 and the second wheel 224b is in motion. The home position 500 and the work position 600 of the roller bed will be explained in detail in conjunction with FIGS. 5 and 6. As shown in FIG. 3, when the actuable component 228 is rotated, the sled 222 moves linearly along with the first wheel 224a and the second wheel 224b. The first wheel 224a moves on the first rail 226a and the second wheel 224b moves on the second rail 226b. The second rail 226b is pushed by the linear motion of the sled 222. For example, when the second rail 226b is attached to the wedge-shaped plate 302, one end of the second rail 226b and the wedge-shaped plate 302 may be abutting a surface of the conveyor frame 102 in an installed position as shown in FIG. 3. The second rail 226b is pushed up from the surface of the conveyor frame 102 during the linear movement of the second wheel 224b. In the example embodiment as shown in FIG. 3, when the actuable component 228 is rotated, the sled 222 moves back from the home position 500, which pushes the second rail 226b out of contact from the conveyor frame 102 due to the linear movement of the second wheel 224b. The second wheel 224b pushes the rail up out of contact with the conveyor frame 102 during the linear movement to tilt the second rail 226b and thereby the roller frame 104 at a desired angle with respect to the horizontal plane 111 of the conveyor frame 102. As shown in FIG. 3, the second wheel 224b is in motion and positioned at an intermediate position between the home position 500 and the work position 600. In the intermediate position, the sled 222 is partially moved backwards along the first rail 226a in response to the rotation of the actuable component 228. The partial movement of the sled 222 causes the second rail 226b to partially alter its position from the non-pivoting position, thereby, pivoting the roller frame 104 to the desired angle. The wedge-shaped plate 302 is pivoted along with the roller frame 104 when the position of the second rail 226b is altered. The position of the second rail 226b is altered when the second wheel 224b is moving in a pressing contact with the second rail 226b. According to an embodiment, a pair of second wheel 224b may be provided with one of the second wheel 224b contacting the second rail 226b and the other of the second wheel 224b contacting additional rails on the conveyor frame 102. According to an embodiment, a pair of wedge shape plates may be provided with a pair of second rail 226b. Each of the second rail 226b capable of being altered to one or more positions in response to the movement of the sled 222. According to an embodiment, the sled 222 may include a pair of first wheel 224 as shown in FIG. 4. Each first wheel 224a movably coupled to their corresponding first rail 226a to enable the linear movement of the sled 222. According to an embodiment, two pairs of first wheel 224 may be installed in the inner face of the sled 222, wherein one of pair of first wheel 224 supported on one first rail 226a and the other pair of first wheel 224 supported on another first rail 226a. According to an embodiment, the actuable component 228, the first wheel 224a, the second wheel 224b, the first rail 226a, and the second rail 226b operate collectively to move the sled 222 from the home position 500 to the work position 600 and vice-versa.

FIG. 5 illustrates a side view of the adjustment mechanism 220 with the sled 222 in a home position 500, in accordance with an embodiment of the present disclosure. The actuable component 228 is held to the conveyor frame 102 using the L-clamp plate 230. The proximal end portion of the actuable component 228 is a free end actuated by an electric actuator (not shown) and the distal end portion is attached to the conveyor frame 102. The sled 222 includes a through hole (not shown) substantially position on a center of the sled 222 on a back face and a front face of sled 222 through which the actuable component 228 is inserted and clamped with the conveyor frame 102. In the example embodiment as shown in FIG. 5, the sled 222 includes the first wheel 224a and the second wheel 224b. The second wheel 224b is movably coupled to the second rail 226b. One end of the second rail 226b abuts the conveyor frame 102 when the sled 222 is in the home position 500. The other end of the sled 222 abuts the second wheel 224b. The wedge-shaped plate 302 supports the roller frame 104 and the second rail 226b. The wedge-shaped plate 302, the second rail 226b and the second wheel 224b are provided on an outer face of the sled 222. The roller frame 104 is provided with the curved slots 210 having shoulder bolts 212 and other slots having locking bolts 214. These bolts 212, 214 lock the roller frame 104 in the home position 500. For example, a pair of shoulder bolts 212 is provided in the curved slot 210 with one of the shoulder bolt 212 locking the roller frame 104 in the home position 500 and the other of the shoulder bolt 212 locking the roller frame 104 in the work position 600. The curved slot 210 and the other slots 211 include a first end 504 and a second end 506. The locking bots 214 and the shoulder bolt 212 abut the first end 504 of the curved slot 210 and the other slots 211 respectively at the home position 500 and the second end 506 in the work position 600.

The second wheel 224b is in an initial position 510 when the sled 222 is in the home position 500. In the initial position 510, the second wheel 224b contacts one end of the second rail 226b, and the other end of the second rail 226b contacts the conveyor frame 102. In the initial position 510, the second wheel 224b is stationary and the second rail 226b is in the non-pivoting position. The second wheel 224b may be moved from the initial position 510 to final position 610 to alter the angle of the roller frame 104. For example, the second wheel 224b moves under the influence of the movement of the sled 222 to transform to the final position 610 and during the movement of the second wheel 224b, the second rail 226b pivots until the second wheel 224b reaches the final position 610. The transformation of the second wheel 224b from the initial position 510 to the final position 610 is in response to the movement of the sled 222 from the home position 500 to the work position 600. As shown in FIG. 5, the sled 222 in the home position 500 transforms to the work position 600 as shown in FIG. 6 in response to a rotation of the actuable component 228.

Figure 7:
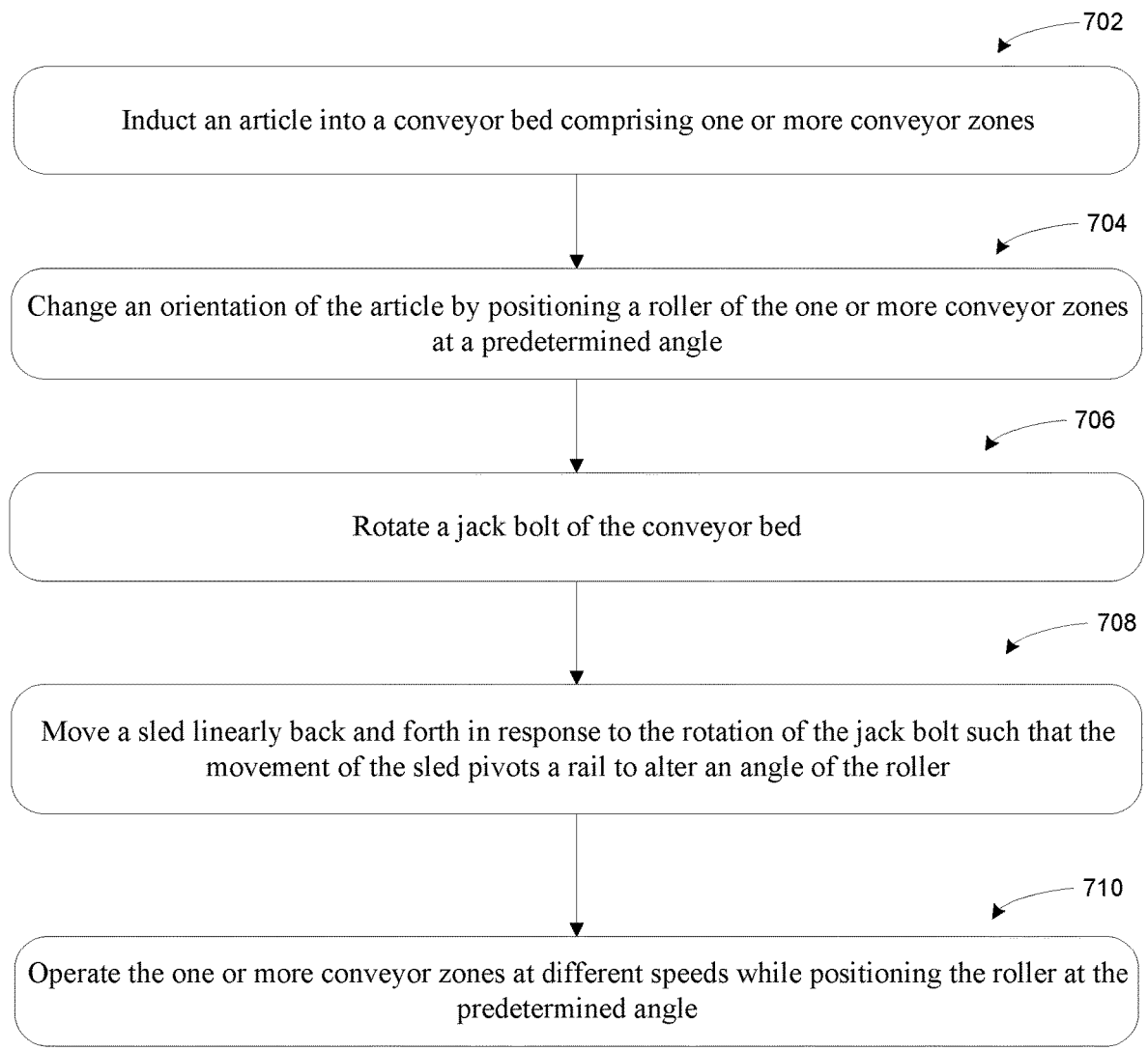
FIG. 7 illustrates a method of operating the adjustment mechanism to alter an angle of the roller frame, in accordance with an embodiment of the present disclosure.

In operation, the actuable component 228 is rotated in either a clockwise or an anti-clockwise direction to slide the sled 222 back and forth linearly on the first rail 226a using the first wheel 224. In response to the movement of the sled 222, the second wheel 224b slides on the second rail 226b. For example, when the sled 222 is gradually moved backwards on the first rail 226a from the home position 500, the second wheel 224b moves gradually from its initial position 510 along with the movement of the sled 222. During the movement from the initial position 510 to the final position 610, the second wheel 224b slides on the second rail 226b and pushes the second rail 226b out of contact from the conveyor frame 102 at the final position 610. The movement of the second wheel 224b from the initial position 510 to the final position 610 occurs gradually in sync with the movement of the sled 222 from the home position 500 to the work position 600. At the work position 600 as shown in FIG. 6, the sled 222 and the second wheel 224b can be pushed backwards to a predefined allowable limit to alter an angle of the roller frame 104. In the work position 600, orientation of the second rail 226b and the wedge-shaped plate 302 supporting the roller frame 104 is transformed to position the roller frame 104 at an angle with respect to the horizontal plane 111 of the conveyor frame 102. The actuable component 228 may undergo a reverse rotation to transform the sled 222 back into the home position 500 and alter the angle of the roller frame 104. According to an embodiment, the sled 222 may be slid on the first rail 226a and stopped in one or more intermediate positions in between the home position 500 and the work position 600 to orient the second rail 226b and the wedge-shaped plate 302 to a plurality of different positions such that the roller frame 104 is pitched at a plurality of different angles with respect to the horizontal plane 111 of the conveyor frame 102. As shown in FIGS. 6 and 7, an electric motor 502 is provided to each conveyor zone of the conveyor bed 100. According to an embodiment, the electric motor 502 is provided to change a speed of the conveyor zone in order to rotate or change an orientation of products entering and leaving the conveyor zone. According to an embodiment, a main controller of the conveyor bed 100 may transmit control signals to each motor controller to alter the speed of each conveyor zone based on the pitched angle of the roller frame 104 by the adjustment mechanism 220. According to another embodiment, the roller frame 104 may be pitched at different angles by the adjustment mechanism 220 based on a speed of operation of each conveyor zone. The main controller may transmit control signals to the electric actuator operating the actuable component 228 to rotate the actuable component 228 based on the speed of operation of each conveyor zone. In this manner, product can be rotated or oriented to the desired position by automatically changing the roller frame angle and the speed of operation of the rollers on the roller frame.

FIG. 7 illustrates a method of operating the adjustment mechanism to alter an angle of the roller frame, in accordance with an embodiment of the present disclosure. The adjustment mechanism may be positioned in a bottom face of the conveyor bed of a conveyor system with a roller bed positioned on a top face of the conveyor bed with one or more rollers. The conveyor bed may be divided into plurality of conveyor zones with each zone having unique control parameters. The conveyor system, for example, may be a case turner conveyor system. When an article or a product is inducted into the case turner conveyor system, the article is subjected to a rotation sequence conceivable by a single conveyor zone or a group of conveyor zones supported on the conveyor bed. At step 702, the article is inducted into the conveyor bed comprising the one or more conveyor zones. The inducted article may be sensed by one or more sensors positioned on the conveyor bed. For example, the one or more sensors may be positioned in each conveyor zone to record an amount of rotation experienced by the article in a particular conveyor zone. The amount of rotation may be recorded to determine the remaining amount of rotation to be performed on the article before exiting the conveyor bed. The inducted article, at step 704, may be rotated by or re-orientated by positioning the rollers of the conveyor zones at a predetermined angle with respect to a horizontal plane of the conveyor frame. The positioning the rollers of the conveyor zones at the predetermined angle is facilitated by the adjustment mechanism. The adjustment mechanism includes an actuable component and a sled for positioning the rollers of the conveyor zones. At step 706, the actuable component fixed to the conveyor bed and the sled is rotated. The actuable component is rotated by an electric actuator. The actuable component can be rotated clockwise or anti-clockwise based on the predetermined angle for positioning the rollers. At step 708, the sled is moved linearly back and forth in response to the rotation of the actuable component such that the movement of the sled pivots a rail to alter an angle of the rollers of the conveyor bed. The rail may be attached to the sled and a wedge-shaped plate. The wedge-shaped plate is positioned on an outer face of the sled supporting a roller frame on which the rollers are mounted. The roller frame tilts at the predetermined angle based on a pivoting movement of the rail. The pivoting movement of the rail is enabled by the linear movement of the sled. In some examples, the conveyor bed may include a dedicated electric motor for each conveyor zone and a corresponding motor controller. The dedicated electric motor is provided for operating each zone at a particular speed. At step 710, the dedicated electric motor operates the one or more conveyor zones at different speeds while positioning the rollers of the conveyor bed at the predetermined angle. In some examples, the particular speed at which the dedicated electric motor may operate may be based on the predetermined angle. In some examples, the conveyor zones may have two sets of rollers arranged in a side by side arrangement on a single conveyor bed. One set of rollers may be tilted at the predetermined angle and the other set of rollers may not be tilted, wherein the tilted set of rollers may operate at the particular speed dictated by the predetermined angle. In another example, the two sets of rollers may be tilted at the predetermined angle with each set of rollers operating at a different speed. In yet another example, one set of rollers may be tilted at the predetermined angle and the set of rollers may be positioned at angles different from the predetermined angle. According to an embodiment, the predetermined angle may be based on the type of article or product to be handled by the conveyor system. In this regard, a main controller of the conveyor system in communication with the motor controllers of each of the conveyor zones and the controller of the electric actuator of the adjustment mechanism may alter the angle of roller frame and the speed of group of rollers of each conveyor zone based on the type of article to be handled by the conveyor system. Therefore, any type of article may be rotated or re-oriented in the desired position at the desired speed by use of the speed differential and the adjustment mechanism.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

As will be apparent to one of ordinary skill in the art, the preceding control strategies may be implemented using a variety of computing environments, and the computing environments may differ from one another based on device layouts and/or other factors. For example, suitably programmed processor(s) would perform the speed determination and implementation logic and angle adjustment described above (e.g., using information provided by sensors and other modules configured to control neighborhood zones).

The foregoing description of an embodiment has been presented for purposes of illustration and description. It is not intended to be exhaustive or to limit the disclosure to the precise form disclosed. Obvious modifications or variations are possible in light of the above teachings. The embodiment was chosen and described in order to best illustrate the principles of the disclosure and its practical application to thereby enable one of ordinary skill in the art to best utilize the disclosure in various embodiments and with various modifications as are suited to the particular use contemplated. Although only a limited number of embodiments of the disclosure are explained in detail, it is to be understood that the disclosure is not limited in its scope to the details of construction and arrangement of components set forth in the preceding description or illustrated in the drawings. The disclosure is capable of other embodiments and of being practiced or carried out in various ways. Also, in describing the embodiment, specific terminology was used for the sake of clarity. It is to be understood that each specific term comprises all technical equivalents which operate in a similar manner to accomplish a similar purpose.

The invention claimed is:

1. A conveyor bed comprising:
   a conveyor frame;
   a roller frame coupled to the conveyor frame; and
   an adjustment mechanism comprising:
      a first wheel movable on a first rail, wherein the first rail is a fixed horizontal rail;
      a second wheel movable on a second rail, wherein the second rail is a slanted pivotable rail;
      a sled coupled to a bottom face of the roller frame, wherein an inner face of the sled is in contact with the first wheel and the first rail and an outer face of the sled is in contact with the second wheel and the second rail; and
      an actuable component coupled to the sled, wherein the actuable component is configured to move the sled back and forth linearly along the first rail using the first wheel in response to rotation of the actuable component, wherein a movement of the sled rotates the second wheel and pivots the second rail to alter an angle of the roller frame.

2. The conveyor bed of claim 1, wherein the roller frame comprises a plurality of brackets spaced apart from each other, wherein a bottom face of each bracket of the plurality of brackets is coupled to the sled.

3. The conveyor bed of claim 2, wherein a bracket of the plurality of brackets comprises a curved slot with a shoulder bolt attached to the curved slot.

4. The conveyor bed of claim 1, wherein the roller frame is coupled to a mounting bracket, positioned at one of an upstream end of the conveyor bed or a downstream end of the conveyor bed.

5. The conveyor bed of claim 4, wherein the roller frame is coupled to the mounting bracket using shoulder bolts.

6. The conveyor bed of claim 1, wherein the actuable component is fastened to a front face of the sled using a nut.

7. The conveyor bed of claim 1, wherein the adjustment mechanism comprises a plurality of first wheels and first rails capable of moving the inner face of the sled, each first wheel of the first wheels positioned on a respective first rail of the first rails.

8. The conveyor bed of claim 7, wherein the adjustment mechanism comprises a plurality of second wheels and second rails capable of moving the outer face of the sled, each second wheel of the second wheels positioned on a respective second rail of the second rails, wherein the second rail is positioned on a wedge-shaped plate attached to the bottom face of the roller frame.

9. The conveyor bed of claim 1, wherein the sled moves in a first linear direction in response to a clockwise rotation of the actuable component and moves in a second linear direction opposite the first linear direction in response to a counter-clockwise rotation of the actuable component.

10. The conveyor bed of claim 9, wherein in response to movement of the sled, the second rail pivots to one or more positions based on a degree and direction of movement of the sled.

11. The conveyor bed of claim 10, wherein in response to pivoting of the second rail to the one or more positions, the roller frame is pitched at one or more corresponding angles with respect to the conveyor frame.

12. The conveyor bed of claim 1, wherein the roller frame is pitched at an angle with respect to the horizontal plane of the conveyor frame by the movement of the sled.

13. The conveyor bed of claim 1, wherein the adjustment mechanism further comprises an electric actuator comprising a stepper motor and speed reducing mechanism to rotate the actuable component.

14. The conveyor bed of claim 1, wherein a plurality of rollers is attached to the roller frame and divided into a plurality of zones with each zone operating at a differential speed.

15. An adjustment mechanism used to alter an angle of a roller bed comprising:
    a wheel and a rail, wherein the rail is a slanted pivotable rail;
    a sled coupled to a bottom face of the roller bed; and
    an actuable component coupled to the sled, wherein the actuable component is configured to move the sled back and forth linearly in response to a rotation of the actuable component such that the movement of the sled rotates the wheel and pivots the rail to alter an angle of the roller bed.

16. The adjustment mechanism of claim 15, wherein when the actuable component is rotated, the movement of sled pushes the rail to pivot to one or more positions based on a degree of movement of the sled, and wherein the rail is positioned on a wedge-shaped plate attached to a bottom face of the roller bed.

17. The adjustment mechanism of claim 15, adjustment mechanism further comprises an electric actuator comprising stepper motor and speed reducing mechanism to operate the actuable component.

18. The adjustment mechanism of claim 17, wherein the actuable component comprises a first portion and a second portion, wherein the first portion comprises a first end and a second end, wherein the first end is a free end connected to an electric actuator and the second end is coupled to a L-clamp plate and the second portion connected to the sled and the L-clamp plate.

19. A method comprising:
    inducting an article into a conveyor bed comprising one or more conveyor zones;
    changing an orientation of the article by positioning a roller of the one or more conveyor zones at a predetermined angle, wherein positioning the roller comprises:
        rotating an actuable component of the conveyor bed; and
        moving a sled linearly back and forth in response to the rotation of the actuable component such that the movement of the sled pivots a rail to alter an angle of the roller.

20. The method of claim 19, wherein changing the orientation of the one or more articles further comprises:
    operating the one or more conveyor zones at different speeds while positioning the roller at the predetermined angle.

* * * * *